Figure 4:
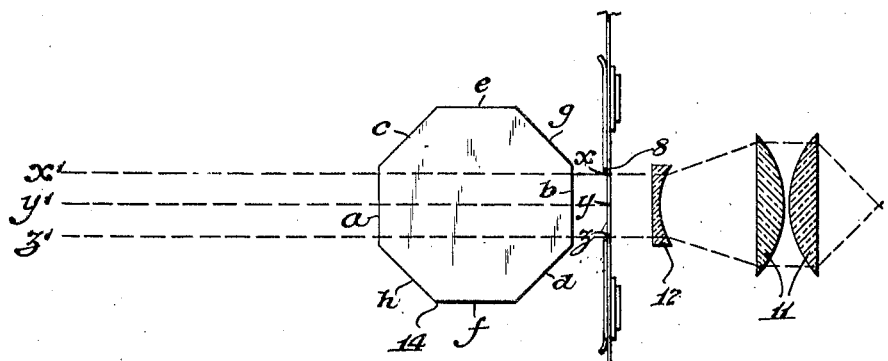

Sept. 26, 1933.     L. J. R. HOLST     1,928,255
APPARATUS FOR PRODUCING MOTION PICTURES
Filed May 9, 1928     4 Sheets-Sheet 1
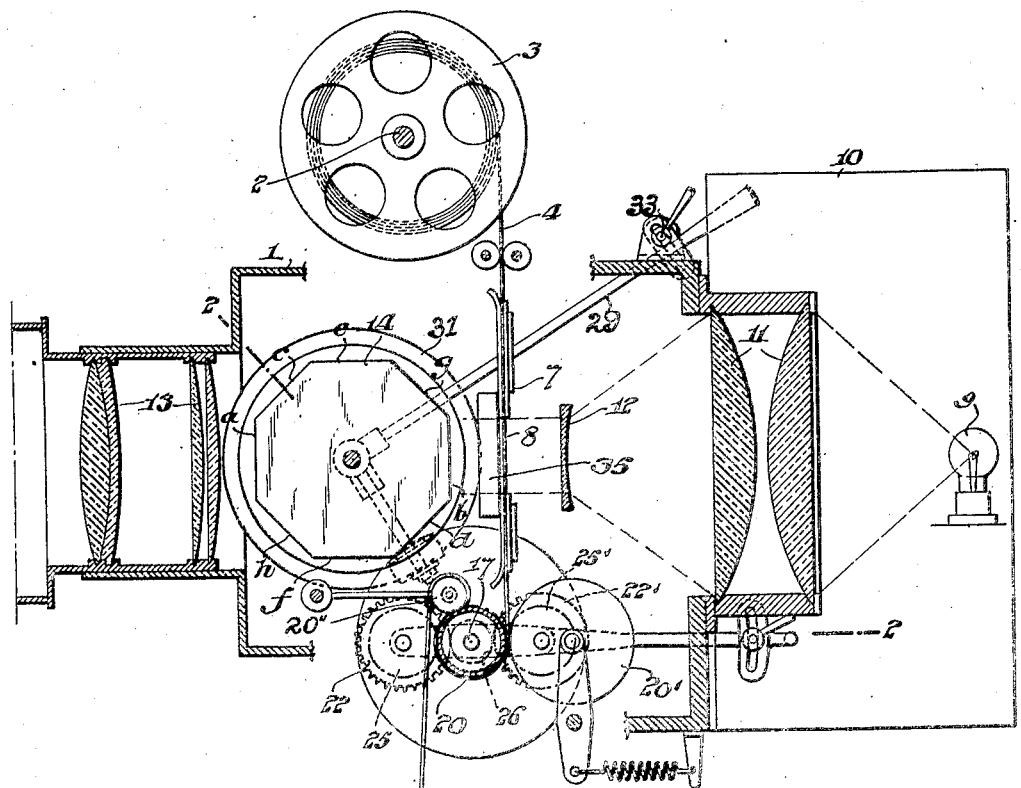
Fig. 1.
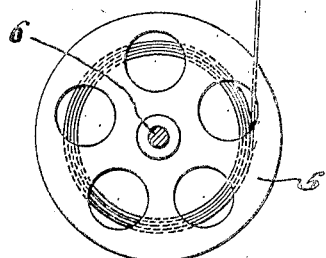
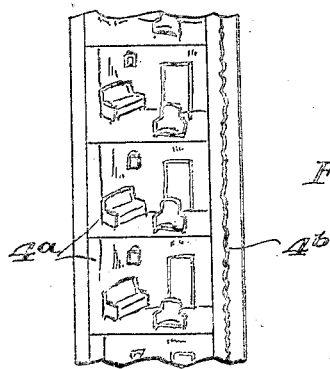
Fig. 6.
Inventor.
Lodewyk J. R. Holst,
Attorney.

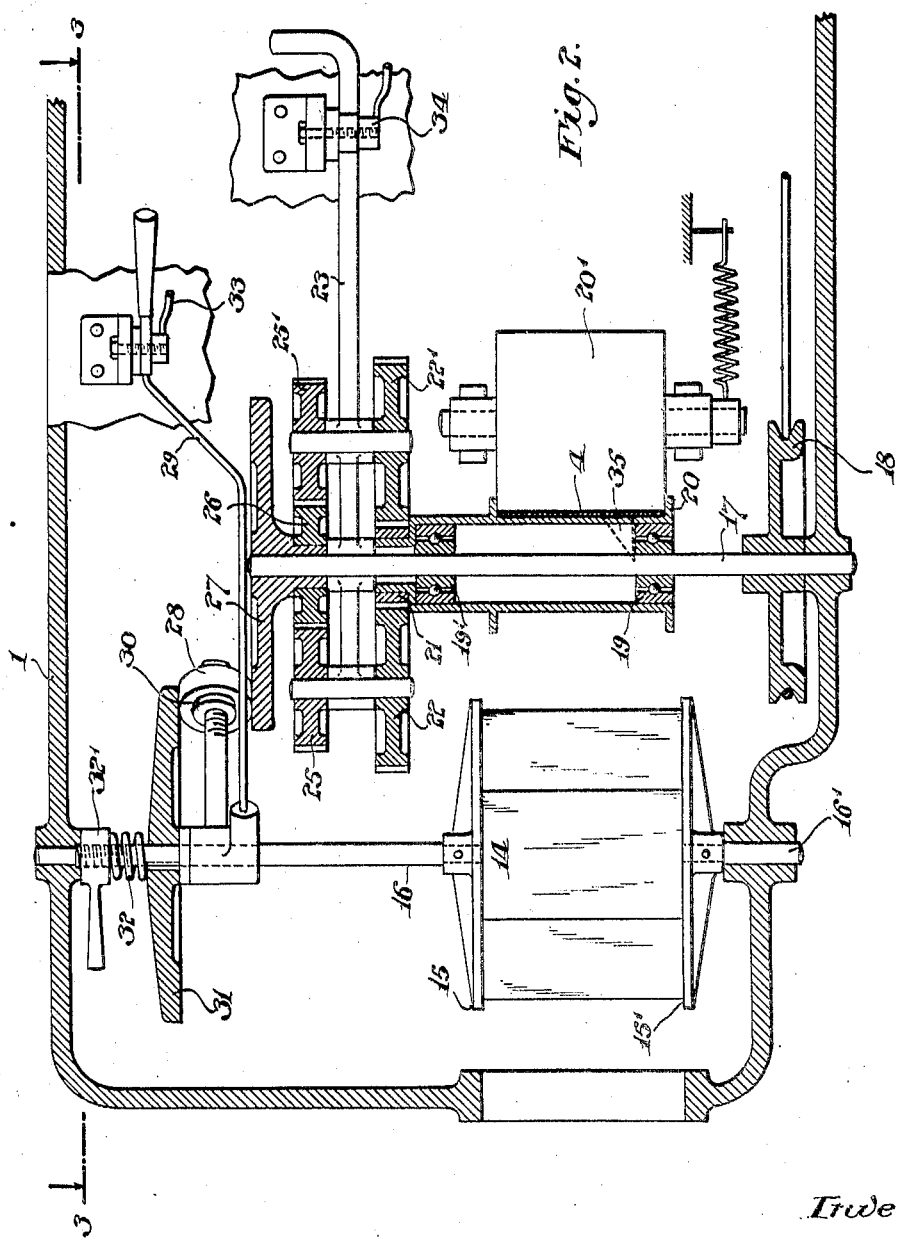

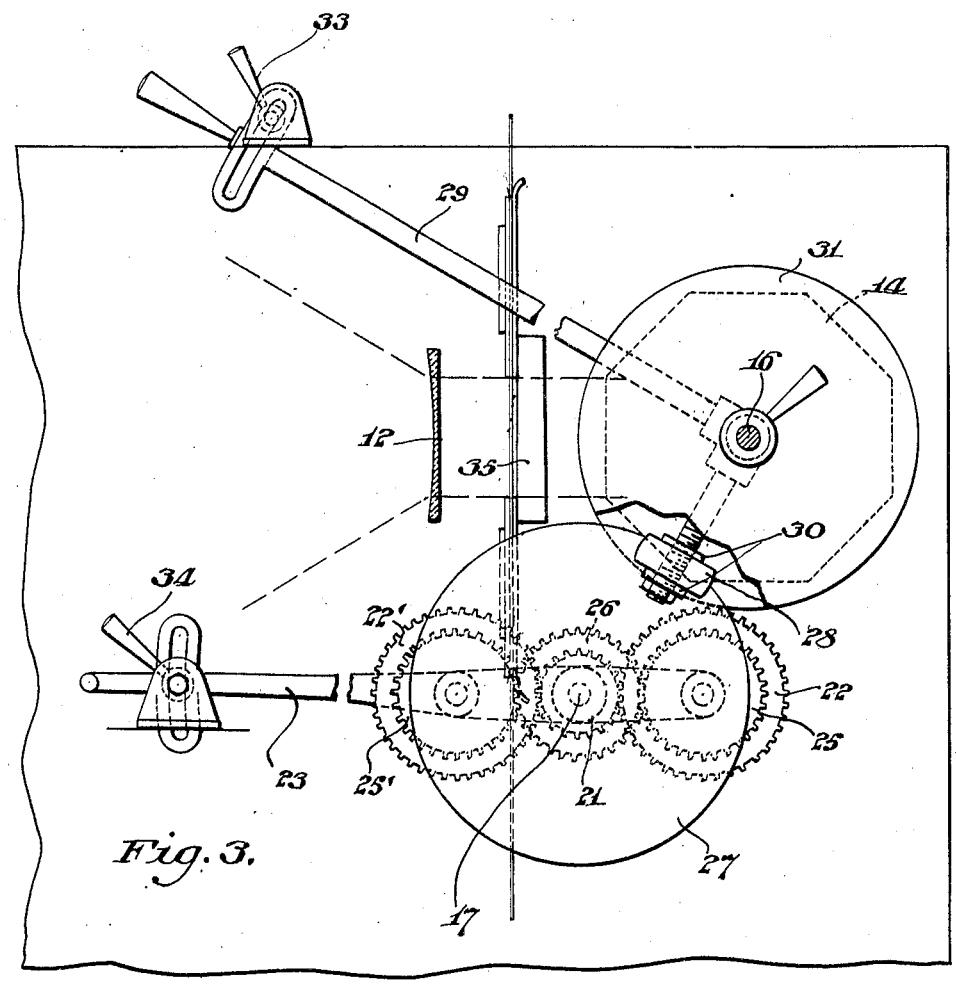

Patented Sept. 26, 1933

1,928,255

UNITED STATES PATENT OFFICE 1,928,255

APPARATUS FOR PRODUCING MOTION PICTURES

Lodewyk J. R. Holst, Brookline, Pa., assignor to The S. M. M. H. Corporation, Dover, Del., a corporation of Delaware Application May 9, 1928. Serial No. 276,213

7 Claims. (Cl. 88—16.8)

My invention is designed to provide an apparatus for neutralizing, in a projected motion picture, the effect of the longitudinal movement of the image ribbon projecting the picture by passing the light rays through a rectifier forming a series of deflecting prisms which deflect the transmitted rays at a rate in exact synchronism with the movement of each image unit or section, as distinguished from synchronism with the rate of movement of a length of film containing a number of image units. In accordance with my invention the light rays from each image unit are deflected through an angle exactly equivalent to and compensating for the movement of such image unit and by properly synchronizing the angular velocity of the prism block with the longitudinal velocity of each image unit, creeping of the projected picture is entirely eliminated. Where the ribbon contains records of sounds as well as of views, the rays from the sound record section of the ribbon are preferably directed angularly through auxiliary transmitting apparatus.

My invention further provides means for effecting the centering of an image unit in the center of the exposure aperture at the instant in which the prism block presents a pair of its faces in exact parallelism with the plane of the ribbon section in the exposure aperture so as to properly "frame" the picture upon the screen.

My invention further provides means for adjusting, during the operation of the apparatus, the angular velocity of the prism block relatively to the longitudinal velocity of an image unit, and also provides means for adjusting, during the operation of the apparatus, the centering of an image unit relatively to parallel faces of the prism block, so that any departure during operation from the desired conditions may be immediately corrected when perceived.

While my improvements are applicable to the projection of perforated image ribbons (in which the effects of expansion and shrinkage are minimized, but not overcome, by the engagement of the perforations on sprocket wheels), my improvements are particularly designed for and are of primary importance in connection with the projection of continuously moving imperforate image ribbon.

The use of continuously moving imperforate image ribbon has many advantages, such as the elimination of shutters and the flicker resulting from shutters; decrease in film breakage and fire hazards resulting therefrom; and the provision of space for recording on the ribbon auxiliary data, such as sound records, whose satisfactory reproduction is dependent upon continuous movement of the ribbon.

Notwithstanding these advantages, neither continuously moving nor imperforate ribbons have achieved any practical success, despite the fact that as early as 1902 the United States patent to Bianchi, No. 708,303, disclosed the principle of projecting a picture from a constantly moving perforated image ribbon through a parallel faced prism rotatable at a variable speed relatively to each image unit but in predetermined and fixed ratio, repeated for every cycle of operation, to the length of the image ribbon passing through the machine. Since, however, the contraction and expansion of image ribbons resulting from atmospheric conditions constantly vary the number of images upon a given length of ribbon, or the length of each image unit, it is impossible to avoid "creeping" of the picture where the movements of the rectifying prism bear a constant relation to the length of the ribbon passing through the machine and no one has heretofore overcome this difficulty.

I have overcome this difficulty by connecting the ribbon feeding mechanism and prism operating mechanism by differentially adjustable apparatus, a driving member whereof rotates in unison with one of such mechanisms, preferably the first named, and the driven member whereof rotates in unison with the other thereof and preferably with the number of image units contained in a unit length of ribbon.

The characteristic features and advantages of my improvements will further appear from the following description and the accompanying drawings illustrating a preferred embodiment of my improved apparatus adapted for the practice of my process.

Figure 5:
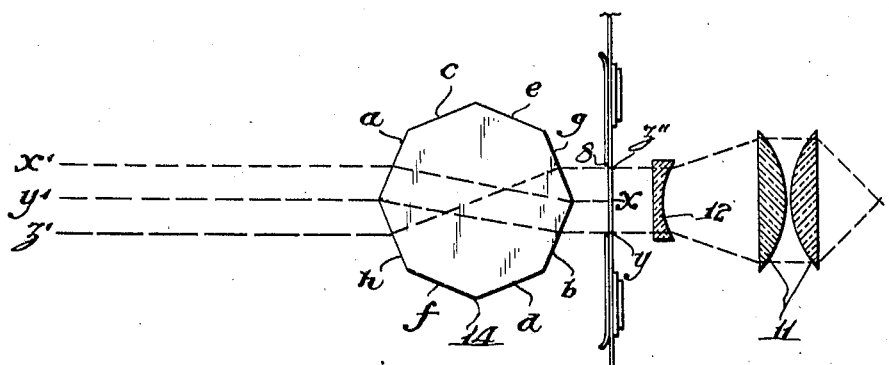

In the drawings Fig. 1 is a part sectional and somewhat diagrammatic side elevation of a motion picture projector embodying my invention; Fig. 2 is an irregular section taken along the line 2—2 of Fig. 1; Fig. 3 is an enlarged sectional view taken along the line 3—3 of Fig. 2; Figs. 4 and 5 are diagrammatic views illustrating the optical principles involved in my invention, and Fig. 6 is a fragmentary view of the type of film strip preferably used in my improved apparatus.

As illustrated in the drawings, a housing 1 has mounted thereon a support 2 for a supply reel 3 from which a strip of image ribbon or film 4 is fed to the take up reel 5 mounted on an axis 6 fixed relatively to the housing 1.

The image ribbon passes through a gate 7 containing a projecting aperture 8 illuminated from a suitable lamp 9 in the lamp house 10. The rays from the lamp 9 pass through condensers 11 which transmit the beam of light to a negative lens 12 adapted to change the convergence angle of the light transmitted to the image unit of the strip 4 in the aperture 8 to compensate for the lengthening of the rear focal distance of the projecting lens 13 necessitated by the insertion of a prism block 14 in the light path between the film gate 7 and the inner surface of the projecting lens 13.

The prism block is mounted between cheek plates 15, 15' carried by shafts or arbors 16, 16' journalled in the housing 1. The block 14 consists of an equilateral transparent polygon having an even number of sides and may be considered as consisting of a series of thick, flat, parallel glass plates of a thickness equal to the distance between any two parallel surfaces, as for instance $a-b$, $c-d$, $e-f$, or $g-h$.

As is well known, the oscillation of a transparent glass block having substantially parallel surfaces deflects the light rays passing therethrough so as to cause an image observed through the block to appear to be displaced; the amount of displacement being dependent upon the refractive index of the glass, upon its thickness and upon its angular rotation.

Consequently, by inserting in the path of rays of light transmitted from an image unit in the aperture 8, a prism block of proper refractive index and thickness forming a plurality of succeeding prisms and giving to such block an angular movement proportioned to the forward movement of each image unit, the rays forming the picture projected upon a screen may be so deflected as to compensate for the movement of the image ribbon in replacing one image by the next one.

Each succeeding prism surface must have exactly the same effect upon each succeeding image unit, and if the surfaces $a-b$ cause the projection of an initial image to appear stationary on the screen, the surfaces $c-d$ must do the same for the second picture, the surfaces $e-f$ must do the same for the third picture and so on.

Figs. 4 and 5 illustrate diagrammatically the effect of the rotation of a prism block upon the projection of images from succeeding image sections. As shown in Fig. 4, the prism block surfaces $a-b$ are parallel to the plane of the film section adjacent the aperture 8, and the position image points $x$, $y$ and $z$ send out light rays which, after passing through the prism block are directed toward the points $x'$, $y'$ and $z'$ to the left of the prism block on their way toward the projecting lens 13. Upon the rotation of the prism block and the simultaneous displacement of the image ribbon so that the point $x$ occupies the position formerly occupied by the point $y$ (as shown in Fig. 5) and a new point $z''$ corresponding to the image point $z$ in the preceding picture occupies the position occupied by $x$ in Fig. 4, the image points $x$ and $y$ in Fig. 5 again fall on the points $x'$ and $y'$, while the rays emanating from the image point $z''$ are caused to fall upon the point $z'$. Hence the descending motion of the points in the image results in zero displacement of the light rays emanating from these image points after they have passed through the prism block.

If, however, a pair of prism surfaces fail to move in exact synchronism with the image unit transmitted therethrough, the projected picture would appear to creep upon the screen and the avoidance of this condition is a leading object of my invention which is accomplished by the adjustment of the rate of rotation of the prism block to the movement of each image during the movements thereof through the following mechanism.

A shaft 17, journalled in suitable bearings in the housing, is provided with a pulley 18 driven from a suitable source of power, such as an electric motor, not shown, which may be also utilized to rotate the reel 5 through any suitable mechanism.

The shaft 17 carries the inner races of two ball bearings 19 and 19', on the outer races of which the film feeding drum 20 is mounted, the ribbon being pressed against the feed drum by a spring pressed roller 20' and passing over the idler 20'' to effect extended surface contact between the drum 20 and the ribbon. A spur gear 21 is concentrically fixed on the end of the feed drum 20 farthest from the pulley 18 and meshes with the two gears 22, 22' which are twice as large as the gear 21, and each of which is rigidly mounted on a pivot passing through the framing handle 23, the pivots being rotatable in the handle which is journalled on the shaft 17.

The pivots extend through their bearings and carry on their opposite ends the gears 25, 25' respectively, the latter being also fastened to the pivots so as to rotate with the same angular velocity as the gears 22, 22'. The gears 25, 25' mesh with the gear 26 and are of the same size as the latter. The gear 26 is rigidly fastened to the shaft 17, which also has rigidly fixed thereto the friction disk 27. An idler friction roller 28 is rotatably mounted on the speed regulating handle 29 and kept between a pair of set rings 30 to prevent lateral movement of the roller 28 along the handle, which is journalled on the shaft 16.

A friction disk 31 splined on the shaft 16 is pressed by a spring 32 into contact with the roller 28 and thereby receives movement from the latter when the shaft 17 is rotated the spring tension being adjustable by a nut 32'.

The angular movement of the speed regulating handle 29 on the shaft 16 changes the radius of the circle of contact of the idler wheel 28 with the driving friction disk 27, and the handle may be fixed in any desired position by the clamp 33. Normally the contact circle of the idler 28 is at equal distances from the centers of the shafts 16 and 17, thus driving the disk 31 at the same rate of rotation as the shaft 17, whereas the feed drum 20 is driven at double this number of revolutions by the cooperative effect of the gears 21, 22, 22', 25, 25' and 26.

Since the feed drum 20 has a circumference equal to the length of four images of normal length, the proper ratio between the speed of a strip having the theoretically correct number of images and that of an eightsided prism block is maintained.

The differential friction drive permits readjustments of the prism rotating speed to compensate for shrinkage or expansion of the image carrying ribbon. The manner in which the feed drum 20 is connected to the drive shaft 17 also permits advancing or retarding the drum with relation to the shaft, by adjustments of the handle 23, to effect the correct framing of the images, which can be accomplished while the projector is in operation and the handle 23 then secured by a clamp 34.

In operation, it is usual to project sixteen pictures per second, hence sixteen succeeding prism surfaces must be presented before the gate in one second. Consequently when the feed rollers make four revolutions per second to feed sixteen pictures, the prism should rotate two revolutions per second or just at one half the speed of the feeding mechanism.

The friction drive arrangement described provides for the relative speeds of the feeding elements and the prism block when each image unit is of the theoretically correct length providing sixteen image units per foot. As the prism block must rotate 45 degrees for each image section passing behind the gate in order to compensate for the movement of the image unit, the differences in the size of the image units, such as occur from day to day as the result of varying temperature and moisture of the air, must be compensated for by slight corresponding speed changes of the prism block, since for each revolution of the feed roller, a standard length of ribbon is displaced, which results in the exposure of either more or less than the standard number of images.

This condition makes itself clear at the projection of the first few images, which will creep either upward or downward along the screen whenever the angular speed of the prism block is out of tune with the image size, and is immediately corrected by proper readjustment of the arm 29 which gradually introduces the exact prism rotation velocity required to keep the images stationary.

When the proper synchronism of the angular velocity of the prism block with the lateral velocity of the image ribbon has been accomplished, the creeping of the projected images is stopped, but it is possible that, instead of one whole image, parts of two successive images will appear on the screen. This will happen whenever the center line of any image section is in the center of the exposure aperture at any other instant than that in which the prism block presents one of its faces in exact parallelism with the plane of the ribbon section in the aperture. The image must then be "framed", so as to bring about the required positional coincidence between an image and a prism face. This is accomplished with the aid of the planetary coupling between the disk 27 and the feed roller 20, whereby a point on one of these parts may be driven any required amount either ahead of or behind a given point of the other by rotating the planetary pinion-carrying arm until the proper framing is obtained, while all elements of the mechanism are in full operative movement.

From the foregoing it will be seen that the light rays projected upon a screen from a series of moving images may be angularly deflected in exact synchronism with and in proportion to the advance of the respective images by turning a prism block in the line of the light rays on its axis a number of rotations directly proportional to the number of images and maintaining the angles between the faces of the block in constant relation to the joints between the images of the series. This desiderata is obtainable notwithstanding the stretching and shrinkage of the image ribbon by the means provided for adjusting the speed of rotation of the prismatic block or ray deflector relatively to the speed of movement of any image while the image strip and ray deflector are in motion, so that the ray deflector is readily adjustable to the number of images per unit of length of the image ribbon and the angles of the prismatic block may be made to coincide with the joints between the images of the series. My improved apparatus also provides for the adjustment, during the operation of projection, of the image strip, ray deflector and projecting aperture so that the parallel sides of the ray deflecting prism are brought into parallelism with the plane of the ribbon section adjacent the projecting aperture when the center line of an image registers with the center line of the projecting aperture.

By rendering practicable the utilization of a continuously moving imperforate image ribbon, I am enabled to provide in direct lineal transverse alignment with the image units 4a a complementary sound record 4b positioned along an edge of the image ribbon and providing means for synchronized reproduction of audible sounds or the like which require continuous movement for their reproduction, the uninterrupted space for such auxiliary records being preferably enlarged by offsetting the longitudinal center line of the image units from the longitudinal center line of the ribbon as illustrated in Fig. 6.

As the auxiliary records are, however, not adapted for projection by the lens which brings the moving pictures on the screen, I provide adjacent to one of upright borders of the image gate a 45° total reflection prism 35 as high as the aperture in the gate and of such a base-width as to intercept the full width of the strip reserved for the secondary records. The light passing through these records is thereby deflected at right angles in horizontal direction to be received in the collective lens of the system used for the reconversion of the photo-impression to their equivalent tonal values.

Having described my invention, I claim:

1. Motion picture apparatus comprising means for moving an image strip having a series of image units thereon, a rotatable ray deflector comprising a transparent block having a series of parallel surfaces, and means for adjusting the speed of rotation of said deflector to the length of the respective image units fed by said means and including a pair of rotatable disks and a rotor contacting with the face of said disks and adjustable toward and from the axis of one of them.

2. Motion picture apparatus comprising means for moving an image strip having a series of image units thereon, a movable ray deflector comprising a transparent block having a plurality of parallel surfaces, and means for adjusting the speed of movement of said deflector to the number of image units per unit of length fed by said means and including a disk connected with said strip moving means, a disk connected with said block, and a wheel contacting with the faces of said disk and adjustable toward and from the axis of one of them.

3. Motion picture apparatus comprising means for moving an image strip having thereon a series of image units, a rotatable polygonal prism having parallel faces through which rays from said image units are projected, and means for adjusting the rates of movement of the angles between the faces of said prism relatively to the rates of movement of joints between the image units on the image strip during the movement thereof and including a rotor for transmitting movement between said strip moving means and block and an arm carrying said rotor and movable about the axis of said block.

4. Motion picture apparatus comprising means forming a projecting aperture, means for moving past said aperture an image strip having thereon a series of image units, a revoluble prism having parallel faces movable into and out of parallelism with the plane of said image strip passing said aperture, and means for adjusting said means second named relative to said prism to center an image unit in said aperture while the faces of said prism are parallel with the plane of said strip adjacent said aperture and including a gear connected with said second means, a pair of gears of larger diameter than and meshing with said first gear, a second pair of gears co-axially with the first pair of gears and a gear having the diameter of and meshing with said second pair of gears.

5. In motion picture apparatus, the combination of a record carrying ribbon and means for giving continuous movement thereto, of means comprising a transparent rotatable prism block operatively connected with the means for propelling said ribbon, and means for adjusting the rotary speed of said prism block to a constant relation with the number of unit impressions contained on any unit length of said ribbon and including a driving disk, an arm movable about the axis of said block and a rotor carried by said arm and movable toward and from the axis of said disk by the movement of said arm about the axis of said block.

6. In motion picture apparatus, the combination with an imperforate image ribbon, of propelling means for continuously moving said ribbon across an exposure aperture, and a motion compensating device comprising a continuously rotating prism block, the means for propelling said film and for rotating said prism block being interconnected by a pair of disks and a friction wheel varying the relative movement communicated between said disks so as to synchronize the movement of successive image units with the movement of successive prism faces.

7. Motion picture apparatus comprising a glass block having a plurality of pairs of parallel faces, an atmospherically expansible and shrinkable image ribbon having thereon a plurality of image units each having a length variable with the expansion and shrinkage of said image ribbon, means for rotating said block, means for moving said image ribbon past said block, means for adjusting during the operation of the apparatus the angular velocity of the block relatively to the longitudinal velocity of an image unit of said ribbon, and means for adjusting, during the operation of the apparatus, the centering of an image unit of said image ribbon relatively to parallel faces of the prism block so that any departure during operation from the desired conditions may be immediately corrected without stopping the apparatus.

LODEWYK J. R. HOLST.